Figure 1:
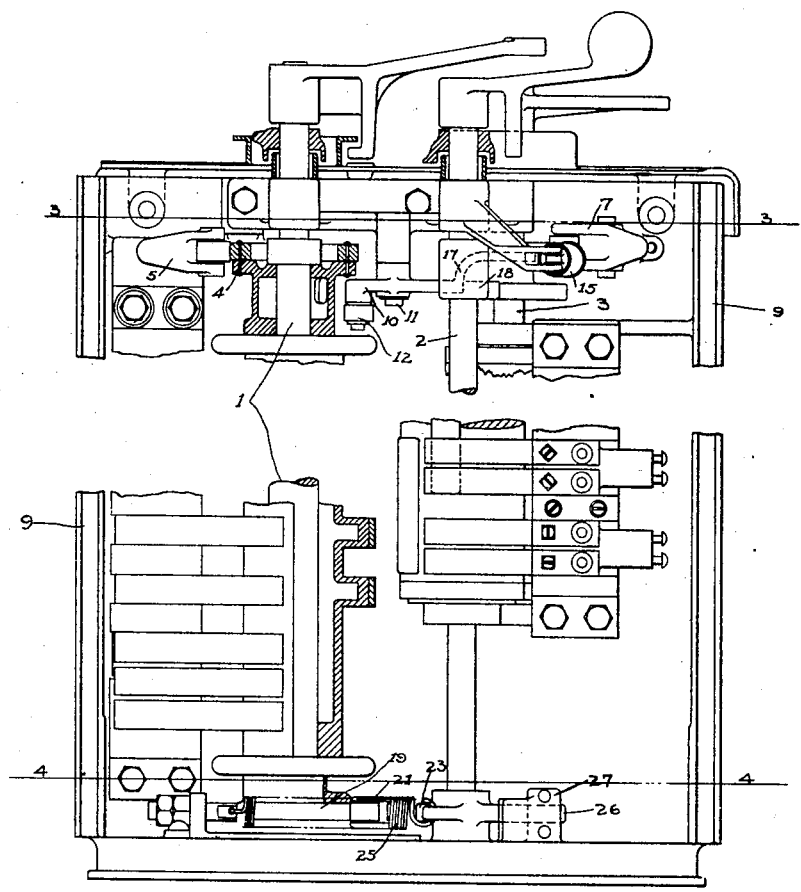

No. 708,157.  Patented Sept. 2, 1902.
F. A. MERRICK & E. W. STULL.
CONTROLLER FOR ELECTRIC MOTORS.
(Application filed Jan. 2, 1902.)

(No Model.)  3 Sheets—Sheet 1.

WITNESSES:  INVENTORS

No. 708,157.  Patented Sept. 2, 1902.
F. A. MERRICK & E. W. STULL.
CONTROLLER FOR ELECTRIC MOTORS.
(Application filed Jan. 2, 1902.)

(No Model.) 3 Sheets—Sheet 2.

WITNESSES:  INVENTORS
  F. A. Merrick
  E. W. Stull
BY
  Geo. H. Parmelee.
  their ATTORNEY.

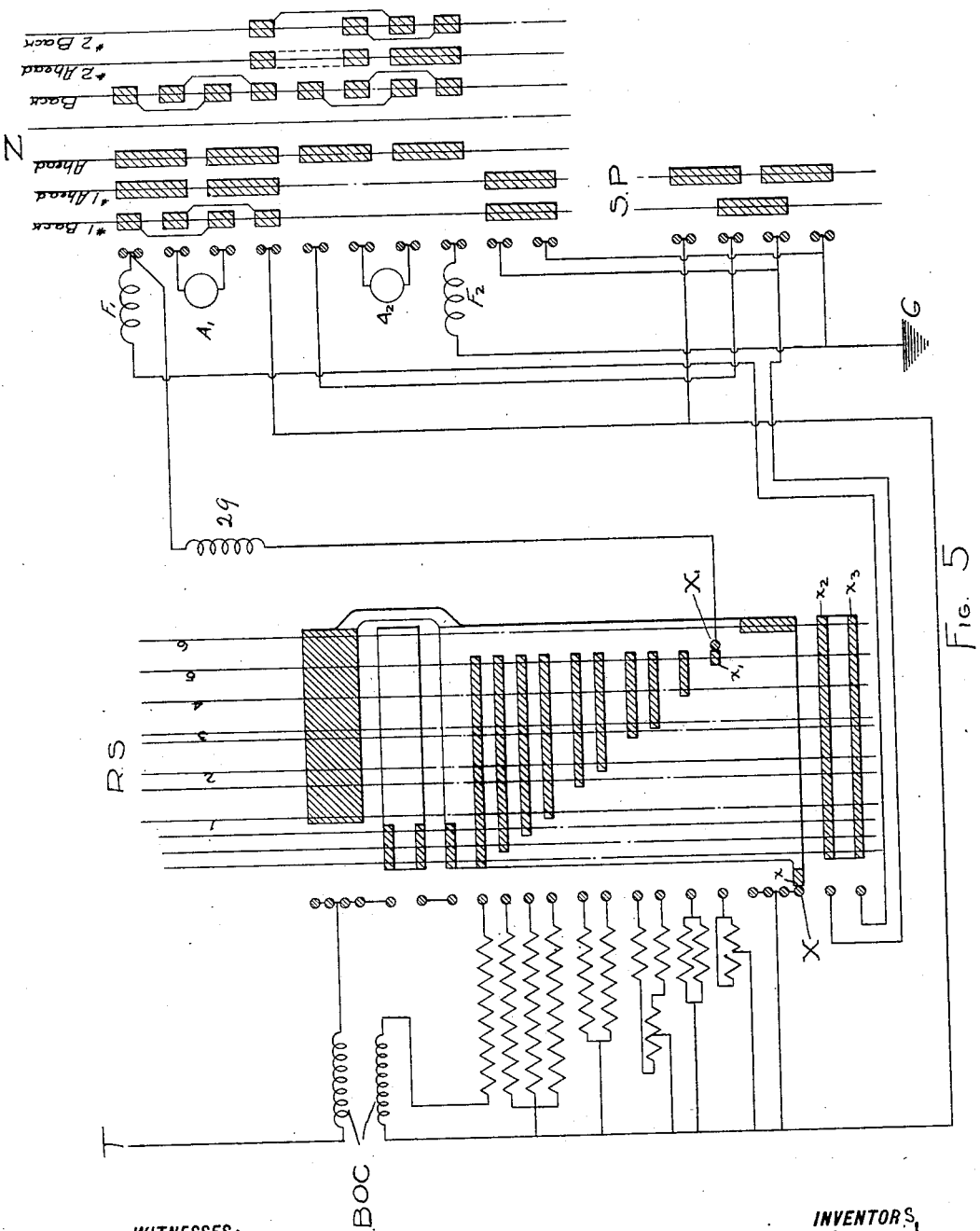

UNITED STATES PATENT OFFICE.

FRANK A. MERRICK AND EMMETT W. STULL, OF JOHNSTOWN, PENNSYLVANIA, ASSIGNORS TO THE LORAIN STEEL COMPANY, A CORPORATION OF PENNSYLVANIA.

CONTROLLER FOR ELECTRIC MOTORS.

SPECIFICATION forming part of Letters Patent No. 708,157, dated September 2, 1902.

Application filed January 2, 1902. Serial No. 88,091. (No model.)

*To all whom it may concern:*

Be it known that we, FRANK A. MERRICK and EMMETT W. STULL, of Johnstown, in the county of Cambria and State of Pennsylvania, have invented a new and useful Improvement in Controllers for Electric Motors, (Case A,) of which the following is a full, clear, and exact description, reference being had to the accompanying drawings, which form a part of this specification.

Our invention has relation to controllers for electric motors, and more particularly to controllers for railway-motors running on circuits of comparatively high potential and to that type of controllers which employ separate rheostatic and series-parallel switches.

Our invention is designed to provide means of improved character whereby the series-parallel switch normally held at its series position cannot be operated to connect the motors in multiple until the latter have been brought to a sufficient degree of speed by the operation of the rheostatic switch. We accomplish this by means of compound locking devices for the series-parallel switch controlled by the operation of the rheostatic switch and acting to release the series-parallel switch only after a predetermined movement of the rheostatic switch. The motorman is thus compelled to start the motors from rest coupled in series with each other and with external resistance and cannot throw the motors into multiple relation until they have attained a proper speed. Means are also provided whereby in normal operation a movement of the rheostatic switch to its off position after the series-parallel switch has been thrown to multiple will cause the return of the series-parallel switch to series position ready for the next start. It is not desirable, however, in all cases that the movement of the rheostatic switch to open-circuit position shall operate to return the series-parallel switch to series position. For instance, the motorman on a down grade may wish to open the trolley-circuit and let his car coast and again close the trolley-circuit at the foot of the grade before the speed has appreciably slackened and when a multiple relation of the motors is desired. We therefore provide automatic means whereby in such cases the series-parallel switch is prevented from going back to series position, as will be fully described hereinafter.

Our invention also consists in the novel construction, combination, and arrangement of parts, all substantially as hereinafter described, and pointed out in the appended claims, reference being had to the accompanying drawings, in which—

Figure 2:
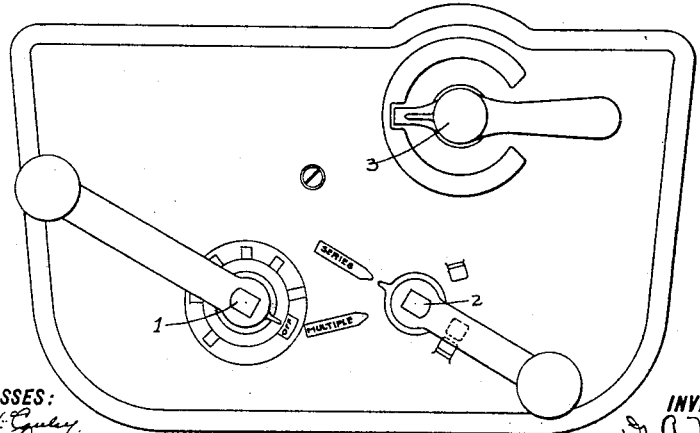
Figure 3:
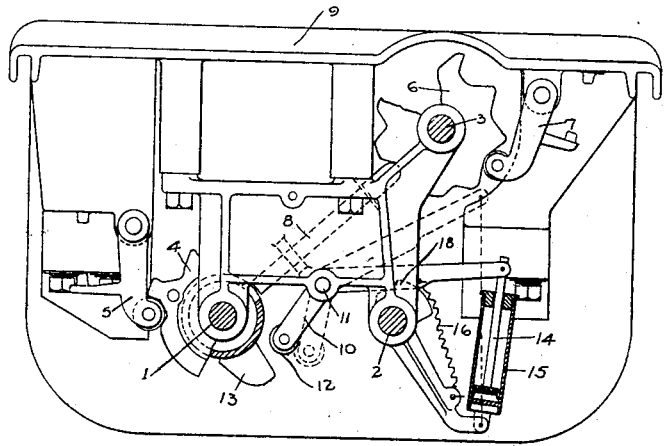
Figure 4:
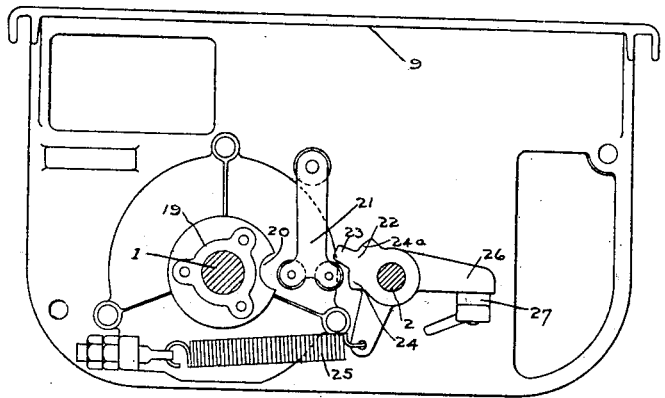
Figures 6, 7:
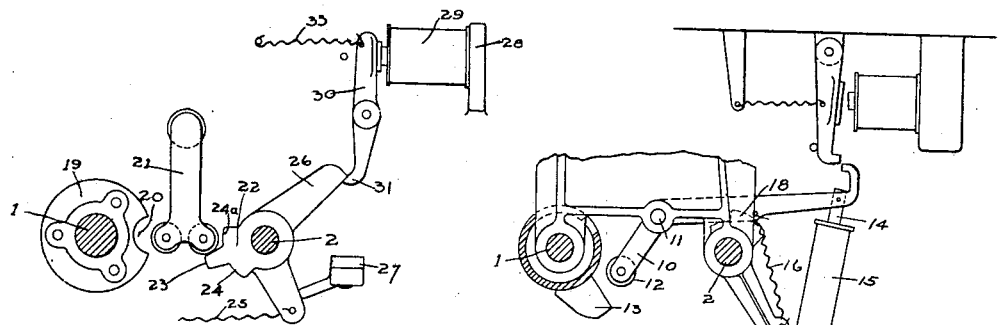

Figure 1 is a front elevation of a controller embodying our invention, the front portion of the casing being removed and the controller-drums partially broken away. Fig. 2 is a top plan view of the controller; Fig. 3, a section on the line 3 3 of Fig. 1; Fig. 4, a section on the line 4 4 of Fig. 1; Fig. 5, a wiring diagram of the controller and motors, the controller being shown in development. Fig. 6 is a partial plan view showing an additional feature of the invention, and Fig. 7 is a similar view showing a modification.

In the drawings the numeral 1 designates the shaft of the rheostatic switch, 2 the shaft of the series-parallel switch, and 3 the shaft of a combined motor-reversing and cut-out switch.

4 is the usual index-plate, and 5 the coöperating pawl for determining the positions of the rheostatic switch. 6 is a similar plate, and 7 a similar pawl for determining the position of the combined reversing and cut-out switch.

8 is an interlock, of any well-known or suitable character, between the rheostatic and the reversing and cut-out switch.

9 wherever seen represents the frame of the controller.

10 is a bell-crank or angle lever pivoted at 11. On the shorter arm of this lever is mounted an antifriction-roller 12, which stands in the path of cam finger or projection 13 on the upper portion of the shaft 1. The longer arm of the lever is connected to the plunger 14 of a dash-pot 15. The lever is normally held in the position shown in full lines in Fig. 3 by means of a spring 16, with a tooth 17 on its longer arm engaging the shoulder of a lock-plate 18, secured to the shaft 2.

On the lower portion of the shaft 1 is a disk or plate 19, having a peripheral notch 20, which when the rheostatic switch is at its off position stands opposite one arm of a pawl-lever 21. On the corresponding portion of the shaft 2 is a cam-plate 22, fixed to said shaft and having a high portion 23 between two low portions 24 24$^a$. When the series-parallel switch is at series position, as shown in Fig. 4, the pawl-lever 21 is resting against the low portion 24 of this cam.

25 is a spring which acts to normally hold the series-parallel switch at its series position.

26 designates a buffer-arm on the shaft 2, and 27 is the buffer-abutment for said arm.

Referring now to Fig. 5, RS represents the development of the rheostatic switch, SP the development of the series-parallel switch, and Z the development of the combined reversing and cut-out switches. These switches are of any well-known character and need not be specifically described. T designates the trolley, G the ground or return side of the circuit, and BOC blow-out coils. A' F' designate, respectively, the armature and field coils of one motor, and $A^2 F^2$ the armature and field coils of a second motor. The circuits can be readily traced for the several positions of the different switches. It will be seen that as the switch RS is moved from position 1 to position 5 additional sections of artificial resistance R are connected in multiple until at position 6 the resistance is entirely short-circuited.

In operating the switch to start the motors from a state of rest it will be seen that during the movement of the switch RS from position 1 to position 6 the series-parallel switch cannot be operated, inasmuch as it is securely locked by the lever 10, as shown in Fig. 3. When position 6 is reached, however, the cam projection 13 has engaged the antifriction-roller 12 and has thereby moved the said lever to the position shown in dotted lines in Fig. 3, thereby releasing the series-parallel switch so far as said lever is concerned. The said switch, however, cannot yet be operated, for the reason that it is locked by the pawl-lever 21, which is prevented from swinging back by reason of the disk or plate 19, and to release this lock it is necessary to return the switch RS to open-circuit position to thereby bring the notch 20 opposite the arm of said lever. During the return movement of the switch RS the lever 10 is held out of locking engagement by the action of the dash-pot, which is made to be a slow one. The series-parallel switch can now be thrown to parallel position, after which the rheostatic switch is again operated. It is necessary for the motorman to hold momentarily the series-parallel switch after it is thus moved until the rheostatic switch has been moved far enough to lock the pawl-lever 21. As soon as the rheostatic switch is again moved to open-circuit position the lock is released, and the series-parallel switch is thrown back to series position by the spring 25.

It will be noted that the pawl-lever 21 has a double locking function—viz., it prevents the series-parallel switch from being moved after the release of the other lock until the circuit has been opened at the rheostatic switch, and it also locks the series-parallel switch in parallel position after it has been moved to that position so long as the circuit remains closed.

We will now describe the means employed to prevent the series-parallel switch from being automatically returned to series position by the opening of the trolley-circuit at such times as the motors maintain their speed. We have preferred to illustrate these means in Figs. 6 and 7 only, as they may be omitted when not desired.

Referring first to Fig. 6, 28 designates a magnet whose coil 29 is arranged to be energized in the manner presently described. This magnet has a pivoted armature 30, whose hooked end 31 is designed to engage the arm 26 on the shaft 2 in the manner shown when the magnet is energized, and thus retain the series-parallel switch in its parallel position.

Referring now to Fig. 5, it will be seen that the coil 29 is included in a circuit which when closed forms a shunt to the armature A'. During the normal operation of the controller this circuit remains open; but when the rheostatic switch is moved to open-circuit position this circuit is closed by means of the two contacts $x$ and $x'$ on the switch RS, which are engaged by contact-fingers X X', the latter being a special finger provided for the purpose. The rotation of the armature A' in its residual field generates sufficient current in said circuit to energize the coil 29 and attract the armature 30, thus holding the switch SP in its parallel position so long as the motors maintain sufficient speed to generate the necessary current. The magnet is so wound that any very great reduction in speed will release its armature, the magnet being opposed not only by the spring 25, but also by the armature-spring 33.

Instead of locking the switch SP in multiple position, as just described, we may arrange the magnet and armature in such a manner as to retain the lever 10, and thus release the lock for the switch SP. This arrangement is shown in Fig. 7. In this case when the trolley-current is again turned on the series-parallel switch can be at once turned to multiple position without any preliminary movement of the rheostatic switch.

Neither of the modifications just described has any effect on the normal operation of the controller, as the stoppage of the motors when the switch RS is turned to open-circuit position prevents the energization or at least any continued energization of the magnet-coil 29.

We do not wish to limit ourselves to the particular mechanisms which we have herein shown and described, as it is obvious that many mechanical changes may be made in the details of construction and combination without departing from the spirit and scope of our invention as it is pointed out in the appended claims.

Having thus described our invention, what we claim as new, and desire to secure by Letters Patent, is—

1. In a controller for electric motors, the combination of a rheostatic switch, a series-parallel switch, a lock for the series-parallel switch temporarily released by the movement of the rheostatic switch to a predetermined running position, and a second lock for the series-parallel switch released by the return of the rheostatic switch to its open-circuit position.

2. In a controller for electric motors, the combination with separately-operable rheostatic and series-parallel switches, of a lock for the series-parallel switch controlled by the rheostatic switch and released by the movement of the latter through its operative position and back to its open-circuit position.

3. In a controller for electric motors, the combination with a rheostatic switch, and a separately-operable series-parallel switch, of a lock for the series-parallel switch controlled by the operation of the rheostatic switch and released by a movement of the latter through its operative positions and back to its open-circuit position, and means connected with said lock and operating automatically to render it again effective after a short interval.

4. In a controller for electric motors, the combination of a rheostatic switch, a series-parallel switch, separate means for operating the two switches, and a spring tending to hold the series-parallel switch at its series position, of a locking-pawl engaging the said series-parallel switch, means on the rheostatic switch for disengaging said pawl when the rheostatic switch is moved to its off position, a spring for returning said pawl to locking position after such disengagement, and a retarding device opposing the action of said spring.

5. In a controller for electric motors, the combination with a rheostatic switch, a separate series-parallel switch, means for normally holding the series-parallel switch at its series position, of a locking device for locking said switch in that position, and means operated by the rheostatic switch for disengaging said locking device, a spring tending to reëngage said locking device, and a retarding device opposing the action of said spring.

6. In a controller for electric motors, the combination with a rheostatic switch, a separate series-parallel switch, means for normally holding the series-parallel switch at its series position, of a locking device for locking said switch in that position, and means operated by the rheostatic switch for disengaging said locking device, a spring tending to reëngage said locking device, and a retarding device opposing the action of said spring, together with a second locking device also engaging the series-parallel switch, and released only when the rheostatic switch is at its open-circuit position.

7. In a controller for electric motors, the combination of a rheostatic switch, a separately-operative series-parallel switch, a spring normally holding said series-parallel switch at its series position, a locking-pawl for locking said series-parallel switch in both series and parallel positions, means on the rheostatic switch whereby at its open-circuit position said lock is released, a second locking-pawl engaging the series-parallel switch and locking it in series position, means on the rheostatic switch for releasing said pawl when the rheostatic switch is at its last running position, a spring tending to reëngage the last-named pawl, and a retarding device acting in opposition to the said spring.

8. In a controller for electric motors, the combination with separate rheostatic and series-parallel switches, and locking devices for the series-parallel switch controlled by the rheostatic switch, of an electromagnetic device operated by current generated by one or more of the motors for modifying the action of said lock under certain conditions.

9. In a controller for electric motors, the combination with separate rheostatic and series-parallel switches, and locking devices for the series-parallel switch controlled by the rheostatic switch and normally requiring a full operation of the rheostatic switch for their release, of a magnet-coil, means whereby the movement of the rheostatic switch to its off position places said coil in circuit with the armature of one of the motors, and an armature for said magnet arranged, when the magnet is energized, to restrain the normal action of the locking devices.

10. In a controller for electric motors, the construction of separate rheostatic and series-parallel switches, a spring tending to hold the series-parallel switch at its series position, a lock for holding the series-parallel switch at multiple position, means whereby said lock is normally released when the rheostatic switch is at open-circuit position, a magnet, a circuit for the coil of said magnet including one of the motor-armatures, and closed by the rheostatic switch at its off position, and an armature for said magnet arranged to engage the series-parallel switch when the latter is at its multiple position and prevent its return to series position so long as the magnet remains sufficiently energized.

In testimony whereof we have affixed our signatures in presence of two witnesses.

FRANK A. MERRICK.
EMMETT W. STULL.

Witnesses:
CORA G. COX,
H. W. SMITH.